(12) United States Patent
Weston et al.

(10) Patent No.: US 12,576,851 B2
(45) Date of Patent: Mar. 17, 2026

(54) VEHICLE PASS MANEUVERING

(71) Applicant: Ford Global Technologies, LLC, Dearborn, MI (US)

(72) Inventors: Keith Weston, Canton, MI (US); Stuart C. Salter, White Lake, MI (US); Michael Alan McNees, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 18/528,955

(22) Filed: Dec. 5, 2023

(65) Prior Publication Data

US 2025/0178606 A1      Jun. 5, 2025

(51) Int. Cl.
| | |
|---|---|
| *B60W 30/18* | (2012.01) |
| *B60W 10/04* | (2006.01) |
| *B60W 10/184* | (2012.01) |
| *B60W 10/20* | (2006.01) |
| *G01C 21/36* | (2006.01) |

(52) U.S. Cl.
CPC ...... *B60W 30/18163* (2013.01); *B60W 10/04* (2013.01); *B60W 10/184* (2013.01); *B60W 10/20* (2013.01); *G01C 21/36* (2013.01); *B60W 2552/05* (2020.02); *B60W 2552/50* (2020.02); *B60W 2556/65* (2020.02); *B60W 2710/18* (2013.01); *B60W 2710/20* (2013.01)

(58) Field of Classification Search
CPC .......... B60W 30/18163; B60W 10/04; B60W 10/184; B60W 10/20; B60W 2552/05; B60W 2552/50; B60W 2556/65; B60W 2710/18; B60W 2710/20; G01C 21/36
See application file for complete search history.

(56) References Cited

U.S. PATENT DOCUMENTS

| | | | |
|---|---|---|---|
| 9,997,075 B2 | 6/2018 | Ono et al. | |
| 10,916,126 B2 | 2/2021 | Iwano | |
| 11,591,757 B2 | 2/2023 | O'Donnell | |
| 11,840,222 B2 * | 12/2023 | Tsuchiya | G06V 20/56 |
| 12,157,504 B2 * | 12/2024 | Namba | G06V 20/588 |
| 2002/0049116 A1 * | 4/2002 | Shiiba | F16H 59/66 477/97 |
| 2018/0208114 A1 * | 7/2018 | Kinoshita | G08G 1/165 |
| 2019/0263391 A1 * | 8/2019 | Matsunaga | B60W 40/06 |

(Continued)

FOREIGN PATENT DOCUMENTS

| | | | | |
|---|---|---|---|---|
| CN | 112009469 A | * | 12/2020 | B60W 40/06 |
| KR | 20170070392 A | | 6/2017 | |
| WO | 2021199579 A1 | | 10/2021 | |

OTHER PUBLICATIONS

English Translation CN-112009469-A (Year: 2025).*

*Primary Examiner* — Rami Khatib

(74) *Attorney, Agent, or Firm* — Frank A. MacKenzie; Brooks Kushman P.C.

(57) ABSTRACT

A first passing width of a first vehicle can be determined based on (1) a first vehicle angle to a horizontal plane defined with respect to a roadway and (2) a first vehicle lateral width. Upon determining that a sum of the first passing width and a second passing width of a second vehicle exceeds a first available passing width at a first location on the road, a second location can be determined on the road having a second available passing width greater than or equal to the first and second passing widths.

20 Claims, 10 Drawing Sheets

(56)     References Cited

U.S. PATENT DOCUMENTS

2022/0189309 A1\*   6/2022   Tsurumi ........... G08G 1/096844
2022/0340173 A1    10/2022   Brown et al.
2022/0415171 A1    12/2022   Arndt Dr habil et al.
2023/0286498 A1\*   9/2023   Oguri ....................... G08G 1/16

\* cited by examiner

VEHICLE PASS MANEUVERING

BACKGROUND

Unpaved and/or remote roads may be narrow and may include portions where it is difficult or not possible for one vehicle to pass another. Data for such unpaved and/or remote roads may be insufficient or missing in maps. Further, such roads can change due to usage, weather, etc.

DETAILED DESCRIPTION

Figure 1:
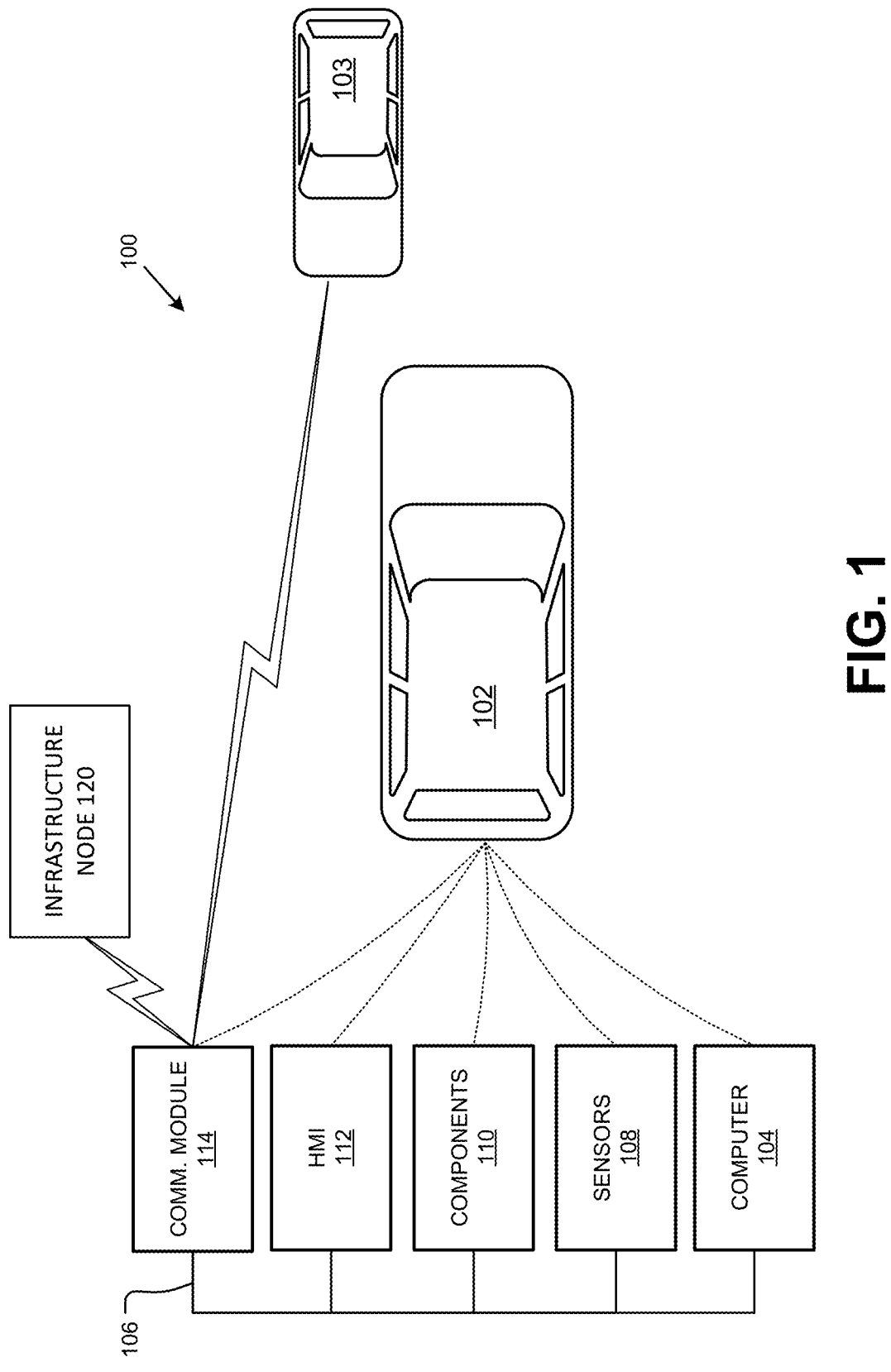
FIG. 1 is diagram of an example system for providing vehicle pass maneuvering.

To maneuver a first vehicle past a second vehicle on a road, e.g., where a width of the road makes passing difficult or impossible, a computer in the first vehicle may collect topographical data from its sensors and upon detecting an approaching second vehicle, the computer may determine a first passing width of the first vehicle based on (1) a first vehicle angle to a horizontal plane defined with respect to a roadway and (2) a first vehicle lateral width. Upon determining that a sum of the first passing width and a second passing width of the second vehicle exceeds a first available passing width at a first location on the road, the computer may determine a second location on the road having a second available passing width greater than or equal to the first and second passing widths.

In one or more implementations, a system includes a computer having a processor and a memory. The memory may store instructions executable by the processor to: determine a first passing width of a first vehicle based on (1) a first vehicle angle to a horizontal plane defined with respect to a road and (2) a first vehicle lateral width; and upon determining that a sum of the first passing width and a second passing width of a second vehicle exceeds a first available passing width at a first location, determine a second location having a second available passing width greater than or equal to the first and second passing widths.

In an implementation, the instructions may further include instructions to transmit to the first vehicle and/or the second vehicle the second location and/or routing guidance based on the second location.

In another implementation, the second passing width of the second vehicle may determined based upon first vehicle sensor data, vehicle-to-vehicle (V2V) communication, and/or Bluetooth Low Energy (BLE) communication.

In a further implementation, the first vehicle angle to the horizontal plane may be determined from topography data, wherein the topography data includes road width, road slope, and a condition of a road surface.

In an implementation of the system, the topography data may further include one or more of a guardrail position, a drop-off, a bridge, a crossroad, a pull-off, a kick-out, or a driveway.

In another implementation of the system, the instructions to determine the second location may further include instructions to determine the first and second passing widths at the second location based on the first vehicle angle at the second location and a second vehicle angle to the horizontal plane defined with respect to the roadway at the second location as determined based on the topography data.

In a further implementation, the routing guidance may be transmitted to the first vehicle and include guidance to the first vehicle for a dig maneuver at the second location, the guidance for the dig maneuver including to actuate a braking force on at least one inner wheel and to actuate a torque force to at least one outer wheel to dig the at least one outer wheel into to a surface of the road to achieve the first vehicle angle.

In an implementation, the routing guidance may include guidance to the second vehicle to proceed over a portion of a tire of the first vehicle.

In another implementation, the routing guidance may include guidance for a dig maneuver where one of the first vehicle or the second vehicle actuate a braking force on inner wheels and actuate opposing torque forces on respective outer wheels to dig the outer wheels into to the surface conditions to achieve the first vehicle angle or a second vehicle angle.

In a further implementation of the system, the instructions may further include instructions to: actuate a propulsion subsystem, a steering subsystem, and/or a braking subsystem of the first vehicle to proceed to the second location; and upon reaching the second location, actuate the braking subsystem to apply a braking force on first vehicle inner wheels and actuate the propulsion subsystem to apply opposing torque forces on respective first vehicle outer wheels to dig outer wheels into to a surface of the road to achieve the first vehicle angle at the second location.

On or more implementations of a method performed by a first vehicle may include: determining a first passing width of a first vehicle based on (1) a first vehicle angle to a horizontal plane defined with respect to a road and (2) a first vehicle lateral width; and upon determining that a sum of the first passing width and a second passing width of a second vehicle exceeds a first available passing width at a first location, determining a second location having a second available passing width greater than or equal to the first and second passing widths.

In an implementation, the method may further include transmitting to the first vehicle and/or the second vehicle the second location and/or routing guidance based on the second location.

In another implementation of the method, the second passing width of the second vehicle may be determined based on first vehicle sensor data, vehicle-to-vehicle (V2V) communication, and/or Bluetooth Low Energy (BLE) communication.

In a further implementation of the method, the first vehicle angle to the horizontal plane may be determined from topography data, wherein the topography data includes road width, road slope, and a condition of a road surface.

In another implementation of the method, the topography data may further include one or more of a guardrail position, a drop-off, a bridge, a crossroad, a pull-off, a kick-out, or a driveway.

In an implementation of the method, determining the second location may further include determining the first and second passing widths at the second location based on the first vehicle angle at the second location and a second vehicle angle to the horizontal plane defined with respect to the roadway at the second location as determined based on the topography data.

In another implementation of the method, the routing guidance may be transmitted to the first vehicle and includes guidance to the first vehicle for a dig maneuver at the second location, the guidance for the dig maneuver including actuating a braking force on at least one inner wheel and actuating a torque force to at least one outer wheel to dig the at least one outer wheel into to a surface of the road to achieve the first vehicle angle.

In a further implementation of the method, the routing guidance may include guidance to the second vehicle to proceed over a portion of a tire of the first vehicle.

In an implementation of the method, the routing guidance may include guidance for a dig maneuver for one of the first vehicle or the second vehicle to actuate a braking force on inner wheels and actuate opposing torque forces on respective outer wheels to dig the outer wheels into to the surface conditions to achieve the first vehicle angle or a second vehicle angle.

In another implementation, the method may include: actuating a propulsion subsystem, a steering subsystem, and/or a braking subsystem of the first vehicle to proceed to the second location; and upon reaching the second location, actuating the braking subsystem to apply a braking force on first vehicle inner wheels and actuating the propulsion subsystem to apply opposing torque forces on respective first vehicle outer wheels to dig outer wheels into a surface of the road to achieve the first vehicle angle at the second location.

With reference to FIG. 1, a connected vehicle system 100 can provide communications between a vehicle 102, other vehicles 103, and one or more infrastructure nodes 120.

Vehicle 102 is a set of components or parts, including hardware components and typically also software and/or programming, to perform a function or set of operations in vehicle 102. Other vehicles 103 may be similar to vehicle 102. Vehicle components 110 typically include a braking system, a propulsion system, and a steering system as well as other subsystems including but not limited to an advanced driver assist system (ADAS) including various driver assist technology (DAT) such as a Global Navigation Satellite System (GNSS) based routing system, a body control system, a climate control system, and a lighting system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Vehicle 102 may also include a human-machine interface (HMI) 112, which may include a microphone, a heads-up display (HUD), an instrument panel, an interface to control one or more components 110, and infotainment system. HMI 112 may include one or more display screens, and one or more of the display screens may receive input via touchscreen control, voice control, and/or physical knobs and switches. For example, map data, route information, and routing instructions for the GNSS-based routing system may be displayed on HMI 112 and receive input by voice or touch.

Computers, including the herein-discussed one or more vehicle computers 104 (e.g., one or more electronic control units (ECUs)) and infrastructure node 120 include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU. The memory can be a separate device from the computer, and the computer can retrieve information stored in the memory, e.g., one or more computers 104 can obtain data to be stored via a vehicle network 106 in the vehicle 102, e.g., over an Ethernet bus, a CAN bus, a wireless network, etc. Alternatively, or additionally, the memory can be part of computer 104, i.e., as a memory of the computer 104 or firmware of a programmable chip.

The one or more vehicle computers 104 (e.g., one or more ECUs) can be included in a vehicle 102 that may be any suitable type of ground vehicle 102, e.g., a passenger or commercial automobile such as a sedan, a coupe, a truck, a sport utility, a crossover, a van, a minivan, etc. As part of a driver assist system or an advanced driver assist system (ADAS), a vehicle computer 104 may include programming to operate one or more of vehicle 102 brakes, propulsion (e.g., control of acceleration in the vehicle 102 by controlling one or more of an internal combustion engine (ICE), electric motor, hybrid ICE/electric propulsion, etc. and control power delivery therefrom), steering, climate control, interior and/or exterior lights, etc., as well as to determine whether and when the computer, as opposed to a human operator, is to control such operations, such as by sending vehicle data over the vehicle network 106. Additionally, a vehicle computer 104 may be programmed to determine whether and when a human operator is to control such operations.

Vehicle computer 104 may include or be communicatively coupled to, e.g., via a vehicle network 106 such as a communications bus as described further below, more than one processor, e.g., included in sensors 108, electronic controller units (ECUs) or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually includes a plurality of devices, the vehicle network 106 may be used for communications between devices represented as the computer in this disclosure.

Vehicle network 106 is a network via which messages can be exchanged between various devices in vehicle 102. The vehicle computer 104 can be generally programmed to send and/or receive, via vehicle network 106, messages to and/or from other devices in vehicle 102 e.g., any or all of ECUs, sensors 108, actuators, components 110, communications module 114, HMI 112, etc. Additionally, or alternatively, messages can be exchanged among various such other devices in vehicle 102 via a vehicle network 106. In cases in which the vehicle computer 104 includes a plurality of devices, vehicle network 106 may be used for communications between devices represented as a computer in this disclosure. In some implementations, vehicle network 106 can be a network in which messages are conveyed via a vehicle 102 communications bus. For example, vehicle network 106 can include a controller area network (CAN) in which messages are conveyed via a CAN bus, or a local interconnect network (LIN) in which messages are conveyed via a LIN bus. In some implementations, vehicle network 106 can include a network in which messages are conveyed using other wired communication technologies and/or wireless communication technologies e.g., Ethernet, Wi-Fi, Bluetooth, Ultra-Wide Band (UWB), etc. Additional examples of protocols that may be used for communications over vehicle network 106 in some implementations include, without limitation, Media Oriented System Transport (MOST), Time-Triggered Protocol TTP, and FlexRay. In some implementations, vehicle network 106 can represent a combination of multiple networks, possibly of different types, that support communications among devices in vehicle 102. For example, vehicle network 106 can include a CAN in which some devices in vehicle 102 communicate via a CAN bus, and a wired or wireless local area network in which some device in vehicle 102 communicate according to Ethernet or WI-FI communication protocols.

Vehicle computer 104, other vehicles 103, and/or infrastructure node 120 can communicate with each other directly, e.g., via direct radio frequency communications according to protocols such as Bluetooth or the like. For example, vehicle 102 (as well as other vehicles 103) can include a communication module 114 to provide communications with devices and/or networks not included as part of the vehicle 102, such as a Global Navigation Satellite System (GNSS, not shown), for example. Communication module 114 can provide various communications, e.g., vehicle to vehicle (V2V), vehicle-to-infrastructure or everything (V2X) or vehicle-to-everything including cellular communications (CV2X) wireless communications cellular, dedicated short range communications (DSRC), etc., to another vehicle 103 or infrastructure node 120 typically via direct radio frequency communications. The communication module 114 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11 (Wi-Fi), DSRC, cellular V2X, CV2X, and the like.

A vehicle 102 in accordance with the present disclosure includes a plurality of sensors 108 that may support the driver assist or ADAS functions. For example, sensors 108 may include, but are not limited to, a LiDAR sensor, one or more wheel speed sensor, steering angle sensor, Global Navigation Satellite System (GNSS) sensor, forward-facing camera, side-facing cameras, rear-facing camera, ultrasonic parking assist sensor, short range RADAR, medium range RADAR, light sensor, rain sensor, accelerometer, wheel torque sensors, inertial sensor, yaw rate sensor, etc.

In addition to supporting ADAS functions, the sensors such as the RADAR, LiDAR, and/or exterior cameras (e.g., forward, rearward, side, B-pillar cameras) may be used together with GNSS/GPS data to collect topographical data and create a topographical map of a road, e.g., when the road has narrow sections and/or lacks data in a vehicle's stored maps. As used herein, topographic or topographical data is data about one or more physical features of a surface of the earth, and can include data about an elevation and/or change in elevation over a distance or an area, and can also include, without limitation, an arrangement, identification, and/or representation of physical features of a surface area such as a road width, a road slope, trees, signs, guardrails, drop-offs, bridges, crossroads, driveways, kick-outs, pull-offs, shoulders, and one or more surface conditions (sand, dirt, gravel, mud, grass, pavement, rocks, etc.), e.g., road surface conditions. A topographical map includes topographic data for an area, i.e., identifies a location or locations of respective topographic features, i.e., physical features of a surface at locations in the area. A topographical map may be combined or stored with a map including other data, e.g., a street or road map or the like.

An infrastructure node 120, sometimes referred to as an edge unit, roadside infrastructure unit, or RSU, includes a physical structure such as a tower or other support structure (e.g., a pole, a box mountable to a bridge support, cell phone tower, road sign support, etc.) on or in which sensors, a communications module, and computer can be housed, mounted, stored, and/or contained, and powered, etc. An infrastructure node 120 is typically stationary, i.e., fixed to and not able to move from a specific physical location. The infrastructure node 120 also includes a power source such as a battery, solar power cells, and/or a connection to a power grid. One infrastructure node 120 is shown in FIG. 1 for ease of illustration, but the system 100 could include a plurality of infrastructure nodes 120 along a road.

The infrastructure node 120 may include one or more sensors having a field of view such as described above for the vehicle 102 sensors 108, e.g., LiDAR, radar, cameras, ultrasonic sensors, etc. The sensors are fixed or stationary. That is, each sensor is mounted to the infrastructure element so as to have a substantially unmoving and unchanging field of view. Because sensors of infrastructure node 120 have a substantially constant field of view, determinations of locations, sizes, and speeds of vehicles (102, 103) can be accomplished with fewer and simpler processing resources than if movement of the sensors also had to be accounted for.

The communications module of infrastructure node 120 may include one or more mechanisms, i.e., conventional radio frequency transmitter and receiver components, by which the computer of infrastructure node 120 may communicate, including any desired combination of wireless (e.g., cellular, wireless, satellite, microwave and radio frequency) communication mechanisms and any desired network arrangement (or arrangements when a plurality of communication mechanisms are utilized). Exemplary communications provided via the communications module can include cellular, Bluetooth, IEEE 802.11, dedicated short range communications (DSRC), cellular V2X (CV2X), and the like.

The computer of infrastructure node 120 includes a processor and a memory such as described above with respect to vehicle computer 104.

A vehicle 102 (or 103) that has collected sensor data to create a topographical map of a portion of road may share the data with an infrastructure node 120 using V2X communication, and infrastructure node 120 may then share the topographical map of the portion of road with another vehicle 103 (or 102) using V2X communication.

Figures 2A, 2B, 2C:
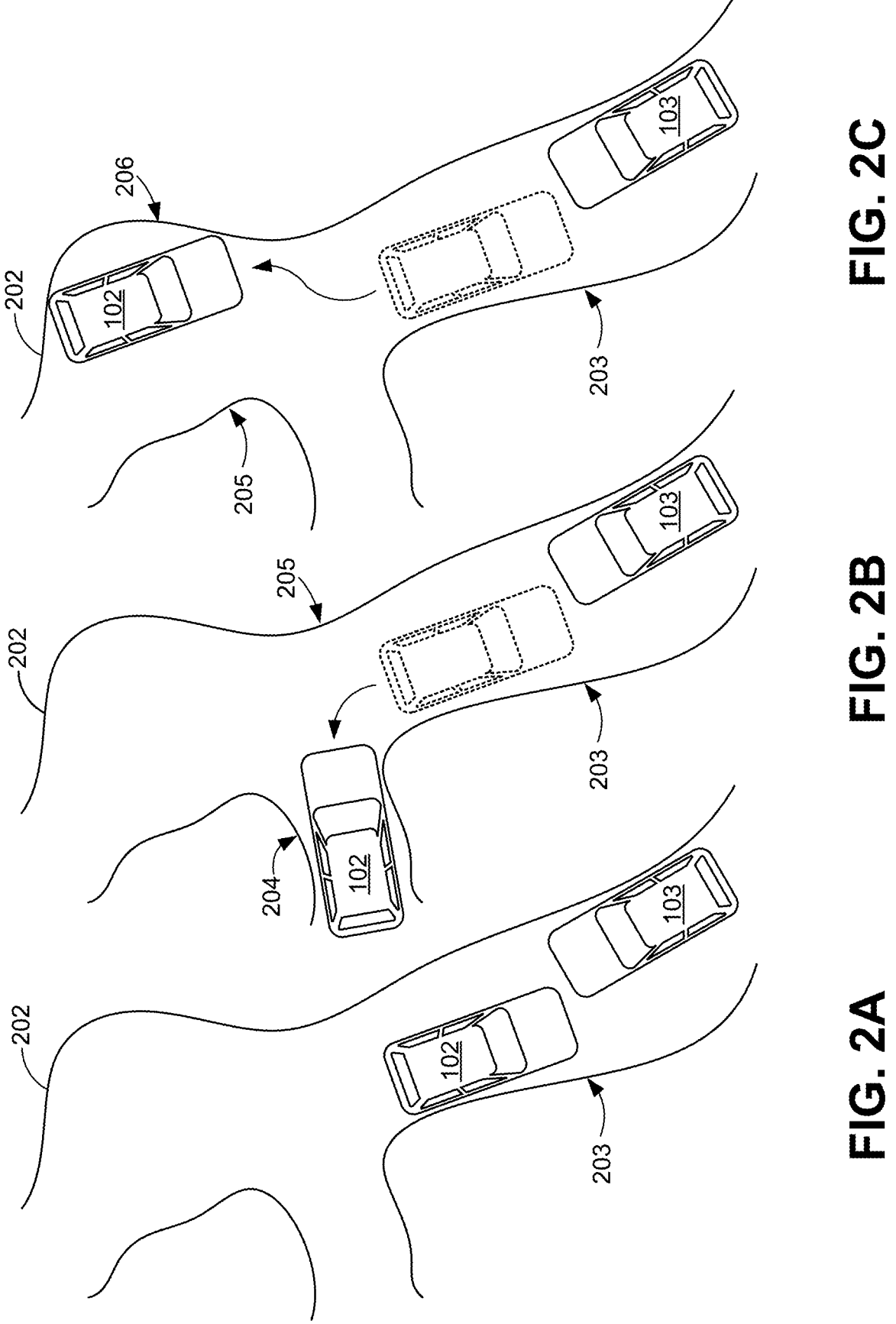
FIGS. 2A, 2B, and 2C are example diagrams of a road illustrating vehicle pass maneuvering for vehicles travelling in opposite directions.

FIGS. 2A, 2B, and 2C illustrate an overhead example of vehicles travelling in opposite directions on a road 202. As used herein, the term roadway or road refers to paved and unpaved vehicular tracks or trails. An "approach" of another vehicle means that a relative speed between a vehicle 102 and another vehicle 103 on a road 202 is expected to result in a crossing or an intersection of vehicle 102 and vehicle 103 at a first location 203 on road 202. An intersection in the present context means that the vehicles 102 and 103 would meet, i.e., touch, one another, and therefore cannot pass each other at the first location 203, e.g., because the road 202 at the first location 203 has an insufficient width for the vehicles 102 and 103 to pass one another. A crossing in the present context means a scenario in which vehicles 102 and 103 can pass one another at the first location 203, e.g., the road 202 at the first location 203 has a sufficient width for the vehicles 102 and 103 to pass one another without intersecting. A vehicle 103 may approach vehicle 102 from ahead or behind vehicle 102. Vehicle 102 may determine an approaching vehicle 103 utilizing data from sensors 108 and/or from V2V, V2X, or BLE communication from communication module 114 with data indicating that vehicle 103 is positioned on road 202 and has a relative velocity bringing vehicle 103 closer to vehicle 102. Further, a lateral width, i.e., a measurement in a horizontal plane of a distance from one side of the vehicle to another, may be defined or determined for a vehicle. The lateral width of a vehicle is typically a greatest distance between sides of the vehicle, and may include outermost or lateral-most points on the vehicle, e.g., most lateral outward points on mirrors, lights, fender flares, luggage racks, etc.

With reference to FIG. 2A, vehicles 102 and 103 travelling on road 202 arrive at a first location 203 on a portion of road 202 at which passing may be challenging or impossible, and at which the vehicles could intersect, i.e., come into contact with one another, because the width of the road 202 at the first location 203 is smaller than a sum of the respective lateral widths of the vehicles 102 and 103. A computer of vehicle 102 may determine that the second vehicle 103 is approaching, and/or a width of the vehicle 103, based on data from sensors 108, vehicle-to-vehicle (V2V) or vehicle-to-everything (V2X) communication, and/ or Bluetooth Low Energy (BLE) communication. For example, various existing techniques are known and could be utilized for using image sensor 108 data to identify dimensions such as a width of an object such as a vehicle. A vehicle position and/or dimensions such as a vehicle width may also be included in a V2V, V2X, or BLE communication.

In a first scenario illustrated in FIG. 2B, the sensors 108 of vehicle 102 may detect a side road or track such as crossroad or driveway 204 intersecting a road 202 and store this feature in a topographical map. Alternatively or additionally, data describing the crossroad or driveway 204 may be included in a map stored in vehicle 102. Vehicle computer 104 may then determine that the crossroad or driveway 204 provides a second location 205 permitting a passing maneuver and can transmit the second location 205 to the vehicle 102 and/or 103. Computer 104 may provide routing guidance to vehicle 102 instructing vehicle 102 to reverse into the crossroad or driveway 204. Computer 104 may also provide routing guidance to vehicle 103 instructing vehicle 103 to allow vehicle 102 to reach the second location 205 and to then move forward so as to permit vehicle 103 to complete the passing maneuver at the second location 205 and continue travelling on road 202. As used herein "routing guidance" means a datum or data specifying a position of a second location 205 on road 202, which data may further include any other maneuvering instructions for the vehicles 102 and/or 103 (e.g., backing into a driveway 204, waiting for other vehicle to be positioned, performing maneuver to position vehicle at a tilt angle, trajectories, speeds, etc.) to perform a passing maneuver, and "passing maneuver" refers to a positioning and/or movement of vehicles on a road to permit one vehicle to move past the other. Typically, a first vehicle will be statically positioned, i.e., not moving (e.g., vehicle 102 positioned in crossroad or driveway 204), such that a second vehicle (e.g., vehicle 103) may move to pass the first vehicle.

In a second scenario illustrated in FIG. 2C, the sensors 108 of vehicle 102 may detect a bump-out or pull-off 206 where the road width widens, i.e., increases, along road 202 and store this feature in a topographical map. Alternatively or additionally, data describing the bump-out or pull-off 206 may be included in a map stored in vehicle 102. Vehicle computer 104 may then determine that the bump-out or pull-off 206 provides a second location 205 permitting a passing maneuver and transmit the second location 205 to the vehicle 102 and/or 103. Computer 104 may then provide routing guidance to vehicle 102 instructing vehicle 102 to reverse into the bump-out or pull-off 206. Computer 104 may also provide routing guidance to vehicle 103 instructing vehicle 103 to allow vehicle 102 to reach the second location 205 and to then move forward so as to permit vehicle 103 to complete the passing maneuver at the second location 205 and continue travelling on road 202.

Figures 3A, 3B, 3C:
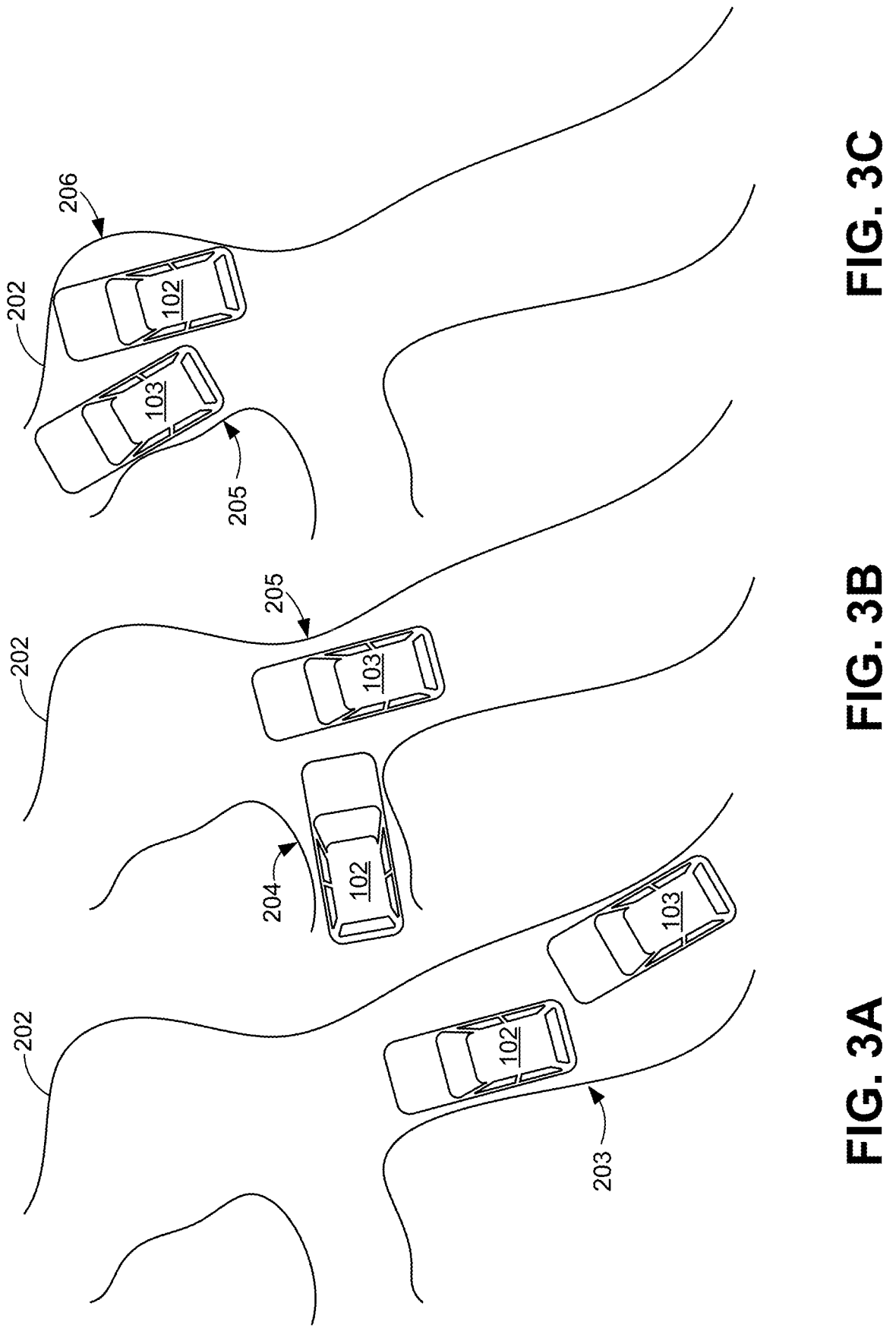
FIGS. 3A, 3B, and 3C are example diagrams of a road illustrating vehicle pass maneuvering for vehicles travelling in the same direction.

FIGS. 3A, 3B, and 3C illustrate an overhead example of vehicles travelling in a same direction on a road 202.

With reference to FIG. 3A, vehicles 102 and 103 travelling on road 202 arrive at a portion of road 202 when vehicle 103 travels at a higher speed than vehicle 102. The vehicles 102 and 103 may be prevented from or have difficulty passing each other because the width of the road 202 at the portion of the road 202 is smaller than a sum of the respective lateral widths of the vehicles 102 and 103. The vehicle approach, width determination, and routing guidance may be performed as described above with respect to FIGS. 2A-2C.

In a first scenario illustrated in FIG. 3B, based on sensor data or stored map data describing the crossroad or driveway 204 in road 202 as described with respect to FIG. 2B, vehicle computer 104 may determine that the crossroad or driveway 204 provides a second location 205 permitting a passing maneuver, and vehicle 102 may follow routing guidance move forward and reverse into the crossroad or driveway 204 (as illustrated, or alternatively may move forward into the crossroad or driveway 204) so as to permit vehicle 103 to pass and continue travelling on road 202.

In a second scenario illustrated in FIG. 3C, based on sensor data or stored map data describing the bump-out or pull-off 206 in road 202 as described with respect to FIG. 2C, vehicle computer 104 may then determine that the bump-out or pull-off 206 provides a second location 205 permitting a passing maneuver, and vehicle 102 may follow routing guidance to move forward into the bump-out or pull-off 206 so as to permit vehicle 103 to pass and continue travelling on road 202.

In the scenarios of FIGS. 2A-2C and 3A-3C as well as those discussed below with respect to FIGS. 4B-4C and 5A-5B, vehicle computer 104 may provide routing guidance to the HMI or actuators of vehicle 102, and/or output routing guidance using visual communication (e.g., Morse code light flashing) or radio communication (e.g., Bluetooth, Wi-Fi, V2V) to vehicle 103.

The scenarios discussed in FIGS. 2A-2C and 3A-3C utilize respective lateral widths of vehicles 102 and 103 and a topographical map of road 202 based on a stored map or topographical data collected by sensors 108. For example, vehicle computer 104 may utilize the topography data of the topographical map of road 202 to plan or generate a passing maneuver based on an angle to a horizontal plane defined with respect to a vehicle supporting surface (hereinafter also referred to as a tilt angle) of road 202, and provide routing guidance for performance of the passing maneuver.

Figure 4A:
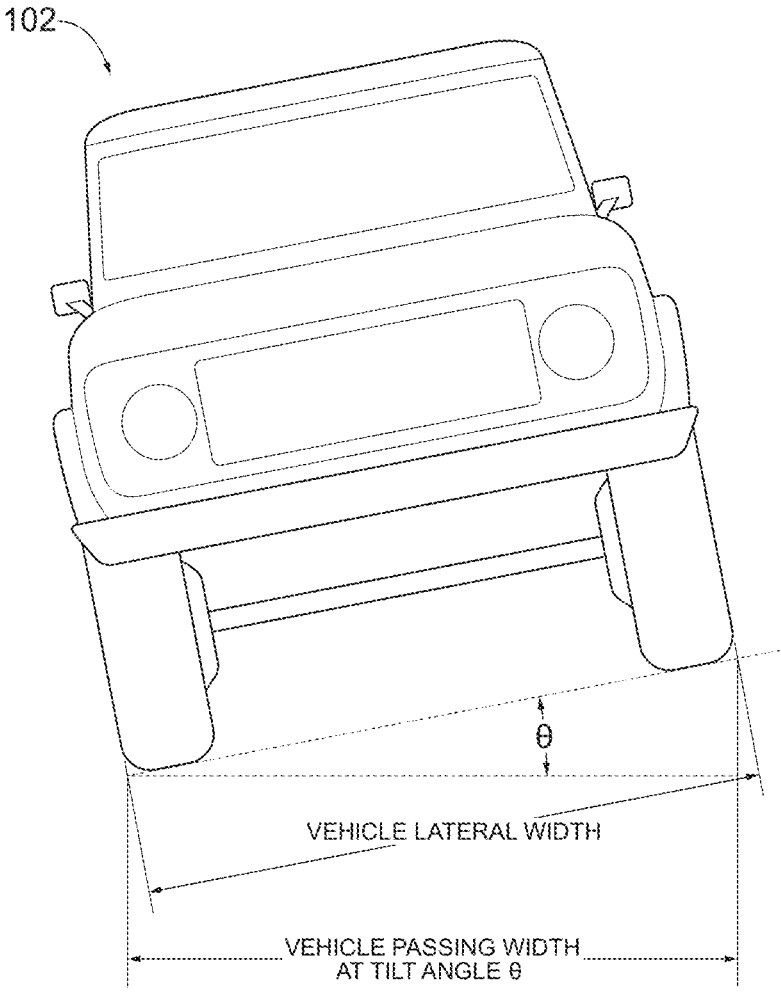
FIG. 4A is an example diagram illustrating vehicle lateral width and vehicle passing width at a tilt angle.

FIG. 4A illustrates vehicle 102 positioned at a tilt angle θ to illustrate an example passing width. As used herein, a passing width of vehicle 102 is lateral measurement in a horizontal plane in which a road width is measured, and which is a lateral distance that the vehicle is specified to occupy during a passing operation. For example, a passing width of a vehicle 102 may be the lateral width of the vehicle 102 plus some specified margin, e.g., 10 cm, 20 cm, etc., to allow the vehicle 102 to pass another vehicle 103. Based on a lateral width of vehicle 102 measured transverse to the vehicle, the vehicle 102 passing width, which on a flat surface would be the same as the lateral width, may be defined at tilt angle θ illustrated in FIG. 4A as the (vehicle lateral width)*(cos θ), which is less than the lateral width of the vehicle 102. Accordingly, routing guidance from computer 104 to position vehicle 102 at a portion of road 202 with a tilt angle θ away from (i.e., the angle θ opens toward the other vehicle 103) another vehicle 103 may decrease a vehicle passing width, i.e., specify a vehicle passing width that is less than the vehicle lateral width, to allow the vehicle 102 to pass another vehicle 103 on road 202.

Figures 4B, 4C:
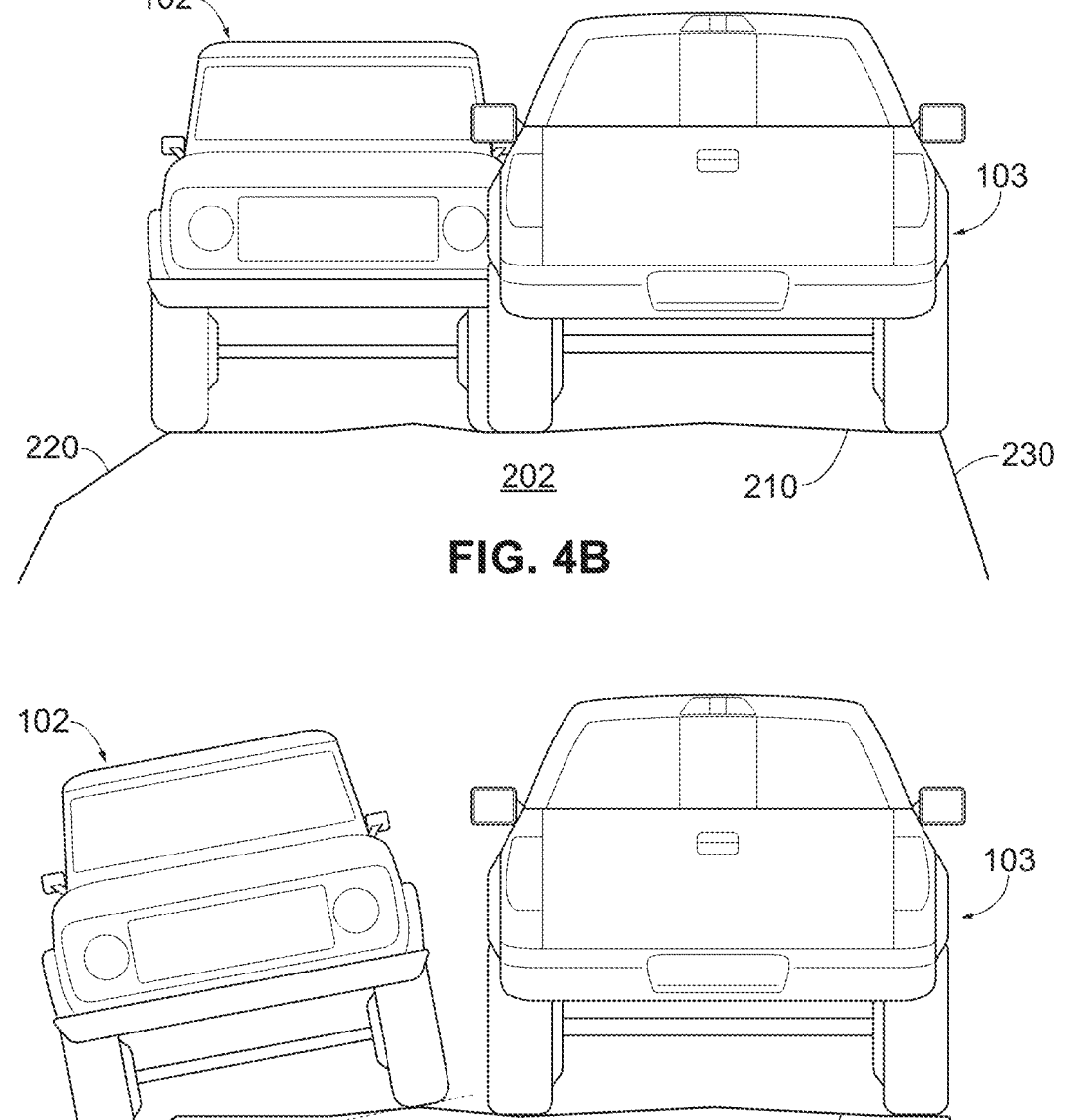
FIGS. 4B and 4C are example diagrams of a passing maneuver.

FIGS. 4B and 4C illustrate an elevation view of an impasse based on vehicles that could intersect and a passing maneuver, respectively. Although illustrated with vehicles 102 and 103 travelling in opposite directions as in FIGS. 2A-2C, the disclosed principles apply equally to vehicles 102 and 103 travelling in the same direction on a road 202 as in FIGS. 3A-3C.

Topographic data for road 202 may be obtained from pre-existing or stored map data, such as stored in a memory of a vehicle computer 104, obtained by other vehicles and shared using V2V/V2X communications, and/or may be obtained using the sensors 108 of vehicle 102. For example, computer 104 may be programmed to receive sensor data from the sensors 108 indicating the topography around the vehicle 102 while the vehicle 102 is traveling forward along the road 202. The computer 104 may further be programmed to identify topographical features or obstacles such as bumps, holes, dips, trees, signs, guardrails, etc. in the environment, e.g., on or proximate to a road 202, based on the sensor data. The sensor data may include image data such as point clouds from RADAR and/or LiDAR, image data from optical cameras, etc. Suitable techniques can be used to determine topographical features such as the foregoing and/or a width of the surface of road 202 as well as any objects in the environment from sensor data such as the afore-mentioned image data.

The computer 104 may be programmed to identify topography such as any sloped portions 220 or drop-off portions 230 on road 202 based on the sensor data. As used herein, a sloped portion 220 is a portion of road having a surface slope at an angle to horizontal which vehicle 102 is capable of traversing, even if only at low speed, and will typically be the same as tilt angle θ of vehicle 102 with all tires traversing the sloped portion 220. A drop-off portion 230 is a portion of road 202 having an angle to horizontal with a surface slope that cannot be traversed by vehicle 102, and will typically not be the same as the tilt angle θ of vehicle 102 since traversal on road 202 may no longer be possible with only one or two tires of vehicle 102 on the drop-off portion 230. The computer identification of sloped portions 220 or drop-off portions 230 on road 202 may depend on the surface slope relative to a predetermined threshold angle that may take vehicle ground clearance, tire grip on the road surface (e.g., coefficient of dynamic friction between a tire and the road surface), and/or other factors such as vehicle center of gravity into consideration, e.g., to determine a moment of the vehicle 102 and/or an angle at which the vehicle 102 may not remain securely on all four tires, which may be used to determine an angle of transition between a sloped portion 220 and a drop-off portion 230. The computer 104 may identify a location as a sloped portion 220 or a drop-off portion 230 in response to detecting changes in a ground and/or road 202 surface level measured with respect to a horizontal plane. The surface slope may be represented in units of angles, e.g., degrees or radians, or as a unitless slope that is a ratio of rise (in units of distance) over run (in units of distance). The surface slope may be determined by a vertical difference between two points of the point cloud (i.e., "rise") over a horizontal distance between the two points (i.e., "run"). Sloped portions 220 and drop-off portions 230 may be determined relative to respective predetermined threshold angles, which may be adjusted based on surface conditions of road 202.

For example, a threshold angle for a transition between a sloped portion 220 and a drop-off portion 230 for a vehicle 102 may be determined as 30 degrees by empirical testing in a test or real-world environment and/or by simulation based on ground clearance, tire type, and/or other factors. Based on the threshold angle of 30 degrees, a surface slope between 3 and 30 degrees may be determined as a sloped portion 220 and a surface slope of greater than 30 degrees may be determined as a drop-off portion 230 in dry conditions. However, the threshold angle of 30 degrees, which marks the transition from a sloped portion 220 to a drop-off portion 230, may be reduced to 20 degrees when surface conditions of road 202 are wet and tire grip on the road surface may be insufficient to permit traversal by the vehicle 102 based upon the wet conditions reducing the coefficient of dynamic friction between the tires and the surface of road 202. The threshold angle of 30 degrees may also be reduced to, for example, 25 degrees when a protrusion in the surface of road 202 between tires of vehicle 102 (i.e., the geometry of road 202 under vehicle 102) would interfere with an underbody of vehicle 102 based upon insufficient ground clearance relative to the protrusion.

Other factors such as the center of gravity of vehicle 102 and/or the suspension travel of vehicle 102 may also affect the predetermined threshold angle based upon vehicle stability considerations and/or the effect of weight transfer on tire grip, and the effect of these factors on the threshold angle may also be determined by empirical testing in a test or real-world environment and/or by simulation. The threshold angle can be selected to limit the tilt angle θ of a vehicle during the path of any autonomous maneuvering or autonomous dig procedure based upon routing guidance from computer 104 to avoid a risk of rollover. When an operator uses routing guidance to manually perform a pass maneuver, computer 104 may monitor for a possible rollover risk and output an alert to the operator if a predicted path or maneuver may result in a risk of rollover by approaching the threshold angle.

Additionally, the predetermined threshold angles may vary from vehicle to vehicle based on tire type, ground clearance, center of gravity, suspension travel, and drive type (2-wheel drive, 4-wheel drive, etc.) and may be determined with empirical testing, e.g., of a type of vehicle 102 in a test or real-world environment, and/or simulation, for example, and may stored by the computer 104. For example, the computer 104 could store the predetermined threshold angle to be used to determine a location at which a road 202 transitions from a sloped portion 222 a drop-off portion 230. Further, in some of limitations, the computer 104 may store a lookup table or the like that specifies various threshold angles for respective surface conditions. For example, sensors 108 could determine one of a wet road surface condition for a dry road surface condition as a current road surface condition, and a lookup table could store a first threshold angle to be used for the wet road surface condition and a second threshold angle to be used for the dry road surface condition. Alternatively or additionally, user input or a factory setting could specify a type or classification of vehicle 102 tires, and the lookup table or the like could store respective threshold angles based on various types or classifications of vehicle tires.

The computer 104 may be programmed to identify features and/or generate a topographic map of the road 202 from the sensor data. The topographic map includes any topographical features of road 202, such as width changes, surface slopes, drop-off, and/or obstacles identified. For example, the computer 104 may add the locations of the road width, slopes, drop-offs, and obstacles to preexisting map data of road 202. The preexisting map data may be stored in the memory of the computer 104 or received via the communication module 114. An absolute location of the topographical features of road 202 may be determined by adding a relative location of the features relative to the vehicle 102, known from the sensor data, to an absolute location of the vehicle 102, which may be known from, e.g., data from a GNSS sensor of the sensors 108. The preexisting map data may include positions and/or approximate boundaries for the road 202.

With respect to FIG. 4B, vehicle computer 104 may analyze topographical data from sensors 108 and/or topographical data from a stored map to determine that a portion of road 202 includes a substantially flat portion 210 on which vehicles 102 and 103 are travelling, a sloped portion 220 adjacent an outside edge of vehicle 102, and a drop-off portion 230 adjacent an outside edge of vehicle 103. The computer 104 may also determine, based on the topographical data, that sloped portion 220 to a side of and/or under an outside edge of vehicle 102 may be traversed at low speed but is unsuitable for operation at desired travel speeds.

Computer 104 may determine an approach of vehicle 103 and further determine that the vehicles 102 and 103 cannot pass each other at travelling speed because the width of the flat portion 210 of road 202 at the portion of the road 202 is smaller than a sum of the lateral widths of the vehicles 102 and 103.

As illustrated in FIG. 4C, computer 104 may identify a sloped portion 220 permitting a low-speed positioning of the vehicle 102 at a tilt angle θ. Use of the sloped portion 220 adjacent flat portion 210 expands the effective width of road 202, decreases the vehicle passing width of vehicle 102 to (vehicle lateral width)*(cos θ), and leans vehicle 102 away from vehicle 103 which further may decrease or eliminate the effect of mirrors and other protrusions on the lateral widths of vehicles 102 and 103.

In an example implementation, vehicle computer 104 may determine a first passing width of vehicle 102 based on (1) vehicle tilt angle θ of the vehicle 102 defined with respect to horizontal and (2) the vehicle lateral width of vehicle 102, e.g., according to a trigonometric calculation such as described above. Computer 104 may use sensor data and/or data received by V2V and/or V2X communication to determine a second passing width of an approaching vehicle 103 and, upon determining that a sum of the first passing width of the vehicle 102, and a second passing width of vehicle 103, exceeds a first available passing width at a first location 203 where the vehicles 102 and 103 will arrive and be unable to pass one another, determine a second location 205 having a second available passing width greater than or equal to the first and second passing widths. For example, the computer 104 may select a second location 205 that utilizes an available tilt angle θ to reduce a first or second passing width of vehicles 102 and/or 103, respectively.

In an implementation, computer 104 may access topographic data from a stored map and/or data from vehicle sensors 108 such as LiDAR, RADAR, cameras, ultrasonic sensors, and roll angle sensors to determine the edges, slope, and drop-offs of road 202 in order to determine an available width of road 202 along portions of road 202 before and/or after the first location 203. For example, image processing techniques can be used to determine a location of road edges, slope and drop off angles, etc. Based on the first and second passing widths of vehicles 102 and 103, the computer 104 may determine the second location 205 having an available width greater than a sum of the first and second passing widths of vehicle 102 and 103 within a portion of road 202 before or after the first location 203. In an implementation, computer 104 may begin determining the available width of road 202 for a predetermined distance of road 202 before or after the first location 203 upon determining that the vehicles 102 and 103 will be unable to pass at the first location, and may terminate the determination process upon identifying a second location 205 having an available width greater than a sum of the first and second passing widths of vehicle 102 and 103 for portion long enough to permit a passing maneuver. In a further implementation, computer 104 may perform the determination process for the predetermined distance before the first location 203 before performing any determination process for the predetermined distance after the first location 203, which may permit vehicle 102 to move to the second location 205 without requiring vehicle 103 to move in reverse for the passing maneuver.

Figure 5A:
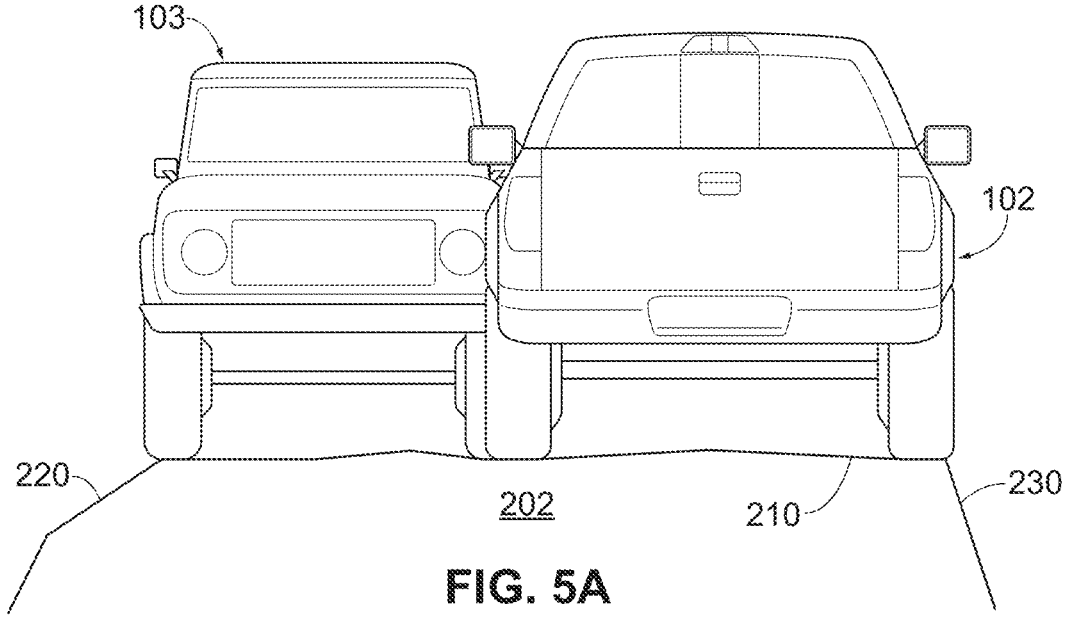
FIGS. 5A and 5B are example diagrams of a passing maneuver using a dig maneuver.
Figure 5B:
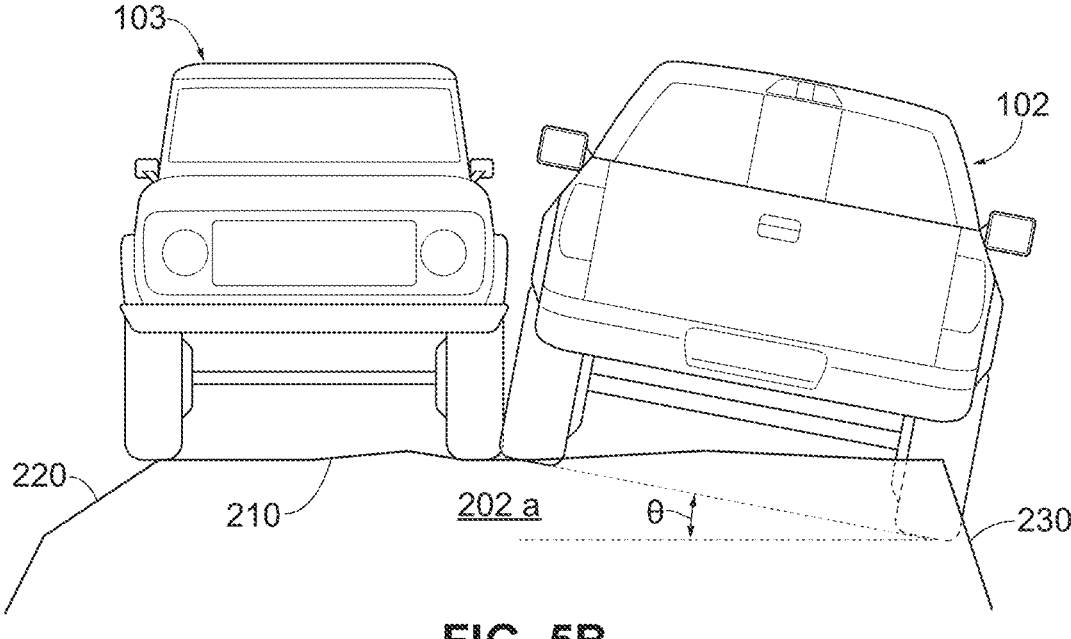

FIGS. 5A and 5B illustrate example diagrams of a passing maneuver using a dig maneuver, wherein vehicle 102 is now illustrated on the drop-off side of road 202. As used herein, a "dig maneuver" refers to applying torque to a wheel when another wheel is fixed so as to cause the wheel with the applied torque to move road material from under the tire and "dig" into the ground, e.g., road, surface, i.e., lodge one or more vehicle tires into a ground surface as to better secure or hold the vehicle in a stationary state. For example, in some situations the computer 104 may determine that portion 220 adjacent the outside edge of vehicle 103 may not be available to use, such as, for example, when there is a guardrail disposed on the portion 220, that the vehicle 103 lacks sufficient under-vehicle ground clearance or 4-wheel drive, or that surface conditions of the portion 220 lack sufficient grip (e.g., mud, loose sand, snow) to traverse at low speed so as to consider it a drop-off portion under current conditions. Accordingly, in such situations, computer 104 may determine that positioning of vehicle 103 on portion 220 of road 202 is not an available option.

With respect to FIG. 5A, vehicle computer 104 of vehicle 102 may analyze topographical data from sensors 108 and/or a stored map to determine that a portion of road 202 includes a substantially flat portion 210 on which vehicles 102 and 103 are travelling, a portion 220 that is not an available option (e.g., obstructed by guardrail or considered a drop-off under current conditions) adjacent an outside edge of vehicle 103, and a drop-off portion 230 adjacent an outside edge of vehicle 102. Computer 104 may use sensor data to determine an approach of vehicle 103 and further determine that vehicles 102 and 103 cannot pass each other on the substantially flat portion 210 because the width of the flat portion 210 of road 202 at the portion of the road 202 is smaller than a sum of the lateral widths (i.e., the passing widths on a horizontal surface) of the vehicles 102 and 103. However, based on topography data of road 202, vehicle computer 104 of vehicle 102 may determine that a surface condition of the substantially flat portion 210 of road 202 permits a dig maneuver to reach an anticipated vehicle angle, for example, based on surface condition data in the topographical data indicating soft or loose material.

As illustrated in FIG. 5B, vehicle 102 has outer wheels, i.e., wheels on a side of the vehicle closest to an edge or boundary or the road 202, here on a side of the road 202 adjacent drop-off portion 230, and inner wheels, i.e., wheels on a side of the vehicle furthest from an edge or boundary or the road 202, here on a lateral side closest to vehicle 103. The vehicle computer 104 may lock, i.e., prevent from rotating, at least one of the inner wheels of vehicle 102, such as by applying a braking force, and may apply a propulsion force to at least one of the outer wheels so as to rotate the outer wheel(s) and dig the wheel(s) into the surface (indicated with dotted lines). In an implementation, vehicle computer 104 may control actuators to apply a braking force to both inner wheels of vehicle 102 and actuate propulsion to apply opposing torques to the outer wheels (i.e., front forward and rear reverse, or front reverse and rear forward) to dig both outer wheels into the surface of road 202 with a net propulsive force of zero. In another implementation, only one outer wheel may need to be or capable of being dug in to achieve a desired vehicle tilt angle θ. By operating actuators to dig one or both outer wheels into the surface of road 202, computer 104 may create the desired tilt angle θ for vehicle 102 to position vehicle 102 at a vehicle angle θ. Such a digging maneuver can decrease the passing width of vehicle 102 to a width or distance determined by computing (vehicle lateral width)*(cos θ) to permit a vehicle passing maneuver. Additionally, the dig maneuver leans vehicle 102 away from vehicle 103 which may decrease or eliminate the effect of mirrors and other protrusions on the lateral widths of vehicles 102 and 103.

In an implementation, a determination by computer 104 of a passing width specified or warranted for a passing maneuver may also include permitting one vehicle to drive over a portion of a tire of another vehicle that is stationary and positioned at a tilt angle θ, as illustrated in FIG. 5B. For example, computer 104 may consider a vehicle passing width of such a stationary vehicle as extending only to an outer third of the tire width of the inner wheel when data from vehicle 102 and/or 103 indicate that vehicle 102 and/or 103 can perform such a maneuver wherein the moving vehicle 103 drives over a portion of tire of the stationary vehicle 102. Data that may be considered by computer 104 in making this determination includes vehicle weight, tire size and/or type (e.g., large off-road tire), tire bead retention force or strength (e.g., rim with beadlock), tire pressure, and/or driver experience level for vehicle 102 and/or 103.

Figure 6:
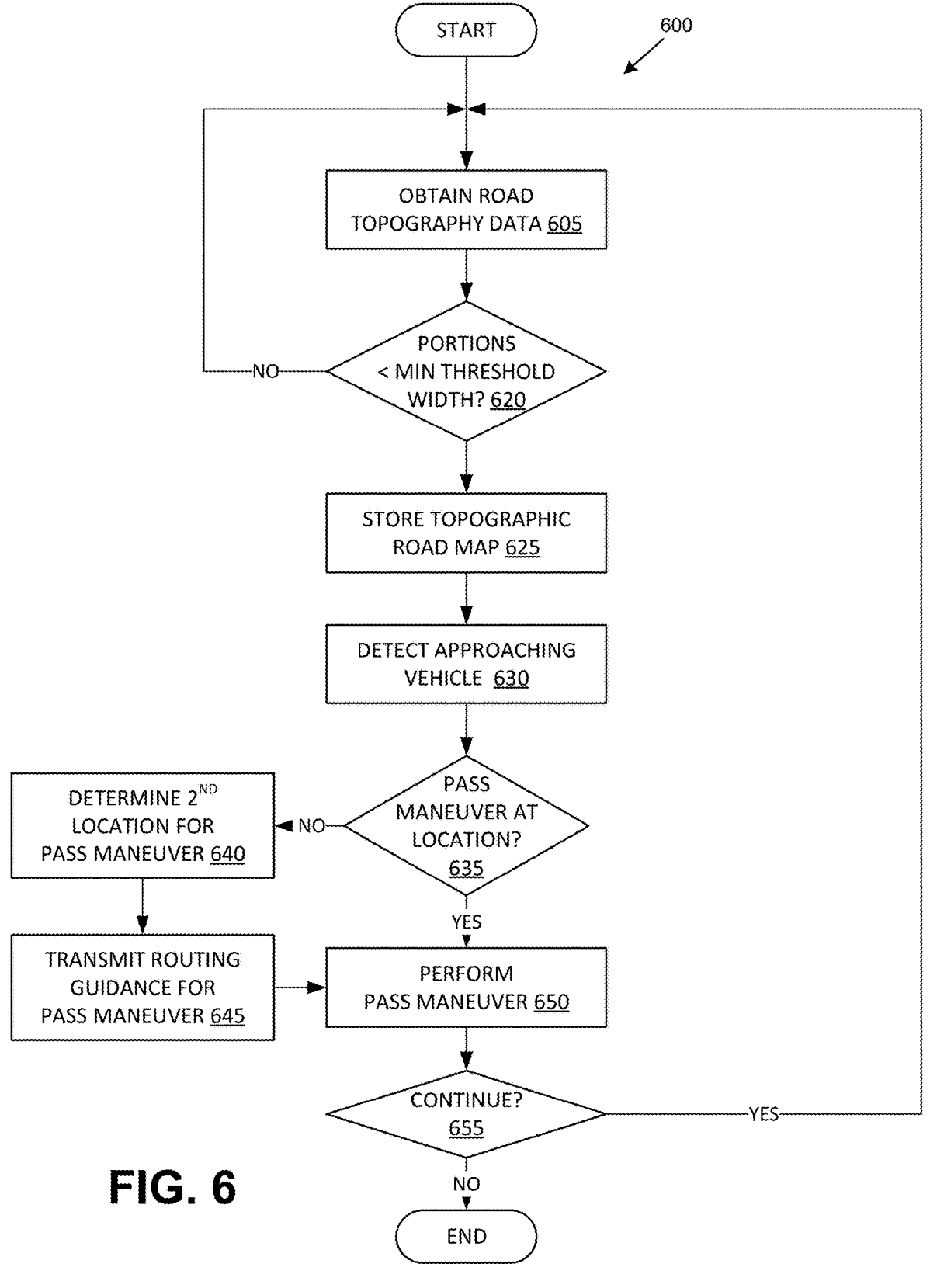
FIG. 6 is an example flow diagram of a vehicle process for road vehicle pass maneuvering.

FIG. 6 is a flow diagram of an example vehicle process 600 for road vehicle pass maneuvering. Process 600 may apply to an opposite-direction pass maneuver as illustrated in FIGS. 2A-2C or a same-direction pass maneuver as illustrated in FIGS. 3A-3C.

The process 600 may begin when a vehicle 102 begins operating and begins operating sensors 108 and/or communication module 114.

In a first block 605, vehicle computer 104 may obtain road topography data based on input of sensor data from operation of sensors 108 and/or from V2V and/or V2X data received by communication module from another vehicle 103 and/or an infrastructure node 120.

In a decision block 620, computer 104 may determine whether portions of the road 202 being traveled on have a width below a minimum threshold width specified to permit vehicles 102, 103 to pass one another, e.g., based on road topography data in a stored map, and/or sensor data, specifying a road width at a location. The minimum threshold width typically can vary based on respective widths of vehicles 102, 103, and/or road conditions, and one or more threshold widths could be stored in a memory of a computer 104, e.g., in a lookup table or the like. A width could be specified for a vehicle 102 manufacturer, and then could be used to determine the threshold width, e.g., based on empirical testing and/or simulation of a desired minimum with for a vehicle 102 to pass a vehicle 103. Further, e.g., based on empirical testing and/or simulation, a minimum threshold width for a vehicle 102 could be varied based on road conditions, e.g., a scaling factor could be provided to increase the minimum threshold with for conditions such as loose gravel or water or mud. Accordingly, examples are possible in which a threshold width may be set at twice the lateral width of vehicle 102 when vehicle 102 is driving on a hard-packed dirt or gravel surface, and two-and-a-half times the lateral width of vehicle 102 when vehicle 102 is on a loose-packed gravel surface. If computer 104 determines the width is not below the threshold width ("NO" at block 620), the computer 104 continues obtaining road topography data at block 605.

If computer 104 determines the width is below the threshold width ("YES" at block 620), the computer 104 continues to block 625, and may at least temporarily store the topographic data in a topographic road map. This topographic road map may be shared with other vehicles 103 and infrastructure node 120 over V2V or V2X communication using communication module 114. The topographic road map may include road width, road slope, road surface condition, guardrail positions, drop-offs, bridges, crossroads, pull-offs, kick-outs, and driveways. For unpaved or off-road tracks, these topographic elements may change over time due to erosion, weather conditions, prior users, etc., making a topographic map based on recently-acquired data more accurate for current conditions.

In a next block 630, computer 104 may detect an approaching vehicle 102 that is expected to cross or intersect with vehicle 102 at a first location 203 on road 202. Computer 104 may detect the approaching vehicle 103 based on input of sensor data or V2V/V2X data. The V2V data may include data sent over BLE or Wi-Fi. For example, forward or rearward-facing sensors 108 may detect a vehicle 103 and that a distance between vehicle 102 and vehicle 103 is decreasing and determine that a crossing or an intersection of vehicle 102 and vehicle 103 is expected to occur at the first location 203 based on, for example, calculations using basic physics equations of motion. Alternatively or additionally, communication module 114 may receive a V2V, V2X, BLE, or Wi-Fi transmission broadcasting a position and speed of vehicle 103 that indicates vehicle 103 is on road 202 and has a relative velocity that indicates that a crossing or an intersection of vehicle 102 and vehicle 103 is expected to occur at the first location 203 based on, for example, calculations using the basic physics equations of motion.

Figure 7:
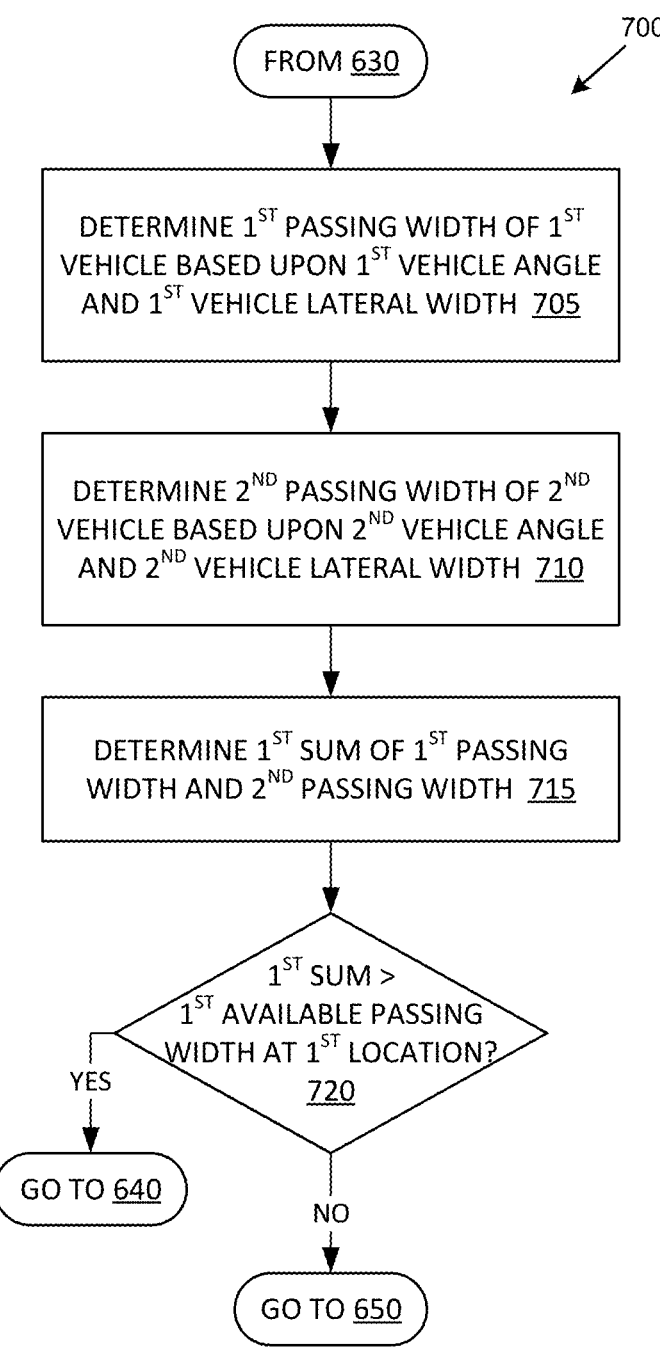
FIG. 7 is an example flow diagram of a vehicle process for determining whether a pass is capable at a location.

In a decision block 635, computer 104 determines whether the road 202 is wide enough at the first location 203 to permit the vehicle 102 and vehicle 103 to pass one another, as described in further detail in FIG. 7. If computer determines that the road 202 is wide enough ("YES" at block 635), the process 600 moves to block 650 and vehicle 102 performs a pass maneuver with vehicle 103.

Figure 8:
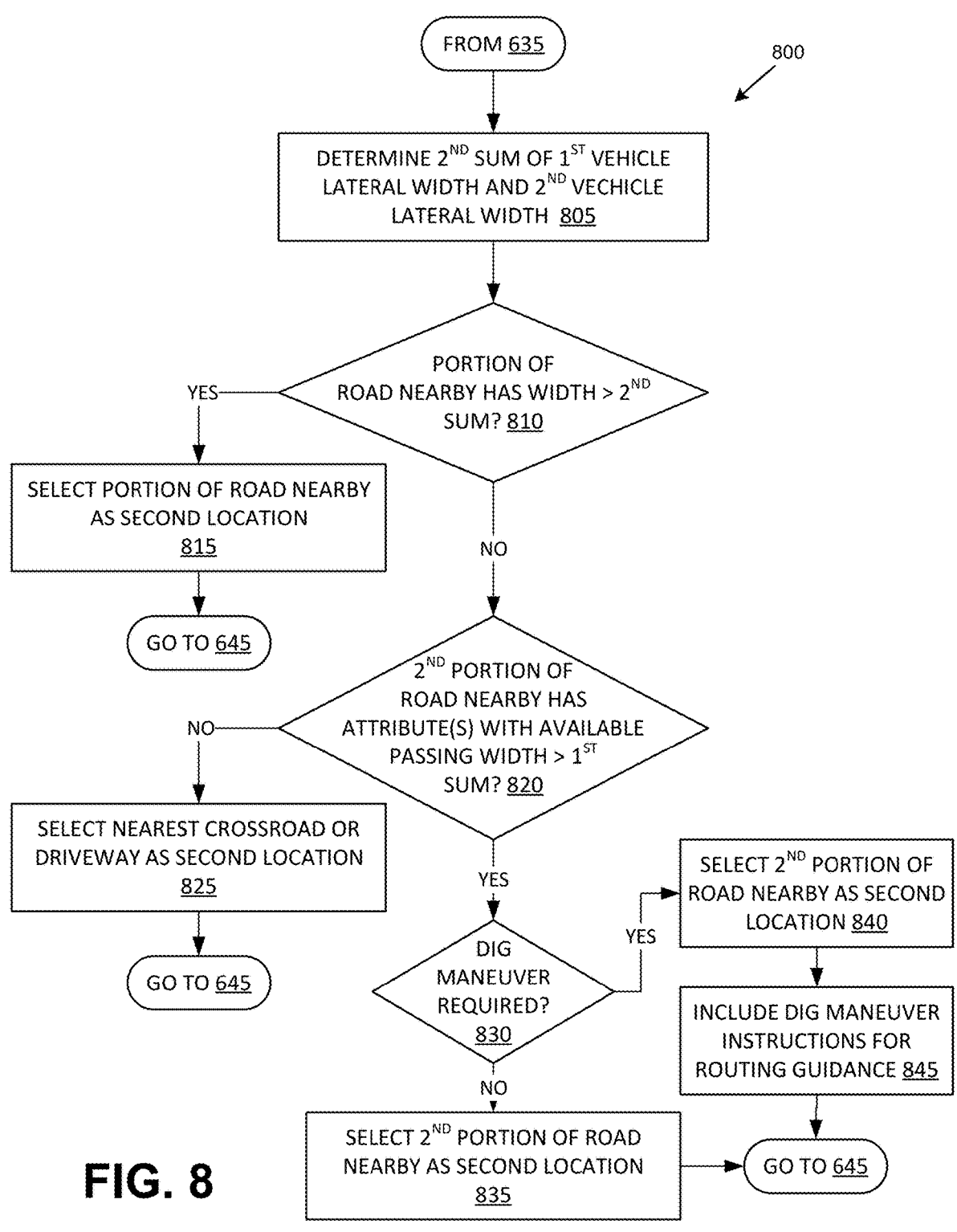
FIG. 8 is an example flow diagram of a vehicle process for determining a second location for a pass maneuver.

If computer determines that the road 202 is not wide enough for a pass to occur at the first location 203 ("NO" at block 635), the process 600 moves to block 640, wherein computer 104 determines a second location 205 to perform a pass maneuver, as described in further detail in FIG. 8.

In a next block 645, computer 104 may transmit routing guidance to vehicle 102 and/or vehicle 103 for the pass maneuver. The routing guidance includes a position of the second location 205 and/or routing to the second location 205 as well as any maneuvers to coordinate a pass such as reversing, waiting, etc. as disclosed with respect to FIGS. 2A-2C, 3A-3C, and 4B-4C. For example, routing guidance to the second location 205 may specify coordination of movements between the vehicles 102 and 103, specific trajectories, and/or speeds. As described further with respect to FIGS. 9A and 9B, the routing guidance may also include guidance for a dig maneuver as described above regarding FIG. 5B. In an implementation, computer 104 may transmit routing guidance for display on an HMI. In a further implementation, computer 104 may actuate subsystems of vehicle 102 to perform the operations of the pass maneuver. Computer 104 may also transmit routing guidance to vehicle 103 by actuation of light-based communications using exterior lighting (e.g., encoding a message, e.g., in or the like Morse code, in activation and deactivation of vehicle lighting such as headlamps or the like), or radio communication (V2V, BLE, etc.) using communication module 114.

The process 600 may then proceed to block 650, wherein computer 104 may actuate subsystems to perform the pass maneuver based on the routing guidance, or an operator of vehicle 102 may use the routing guidance to perform the pass maneuver.

In a next block 655, the computer determines whether to continue process 600. If the vehicle 102 has ceased operating sensors 108 and communication module 114, the computer may determine no to continue ("NO" at block 655), and end process 600. If computer 104 determines that vehicle 102 is still operating sensors 108 and communication module 114 ("YES" at block 655), the process may continue and return to block 605.

FIG. 7 is a flow diagram of an example vehicle process 700 for determining whether a vehicle passing maneuver can be made at a location and expands on block 635 of FIG. 6.

Upon computer 104 detecting an approaching vehicle 102 that is expected to cross or intersect with vehicle 102 at a first location 203 on road 202 at block 630, process 700 proceeds to a block 705, wherein computer 104 determines a first passing width of (first) vehicle 102 based on a first vehicle angle of vehicle 102 at the first location 203 and a first lateral width of the vehicle 102, as described with respect to FIG. 4A.

In a next block 710, computer 104 determines a second passing width of (second) vehicle 103 based on a second vehicle angle of vehicle 103 at the first location 203 and a second lateral width of the vehicle 103 using the same procedure described with respect to vehicle 102 in FIG. 4A.

In block 715, computer 104 determines a first sum of the first passing width of vehicle 102 and the second passing width of vehicle 103.

In a decision block 720, computer 104 determines whether the first sum is greater than the available passing width of road 202 at the first location 203. If the first sum is not greater than the available passing width ("NO" at block 720), a pass is determined to be possible ("YES" at block 635) and the processes 700 and 600 proceed to block 650 of FIG. 6.

If the first sum is greater than the available passing width ("YES" at block 720), a pass is determined to not be possible ("NO" at block 635) and the processes 700 and 600 proceed to block 640 of FIG. 6.

FIG. 8 is a flow diagram of an example vehicle process 800 for determining a second location 205 for a pass maneuver as referenced above with respect to block 640 of FIG. 6.

Upon computer 104 determining that a pass is not possible at a first location 203 at block 635 ("NO" at block 635), process 800 proceeds to a first block 805, wherein computer 104 determines a second sum of the first vehicle lateral width of vehicle 102 and the second vehicle lateral width of vehicle 103.

In a next decision block 810, computer 104 determines whether a portion of road 202 within a predetermined distance, for example 50 meters or the distance to nearest driveway 204 or crossroad, has a width greater than the second sum, e.g., based on stored map data or a stored topographical map. If computer 104 determines that a portion of road 202 within the predetermined distance has a width greater than the second sum ("YES" at block 810), the process 800 proceeds to block 815, wherein computer 104 selects the portion of road 202 having a width greater than the second sum as a second location 205 to perform a pass maneuver and proceeds to block 645 of FIG. 6.

If computer 104 determines that a portion of road 202 within the predetermined distance does not have a width greater than the second sum ("NO" at block 810), the process 800 proceeds to a decision block 820, wherein computer 104 determines whether a second portion of roadway within the predetermined distance has one or more attributes permitting an available passing width greater than the first sum. For example, the road topography data for road 202 at the second location 205 may include an attribute such as a road slope permitting a tilt angle θ that sufficiently expands the available passing width or a soft surface condition permitting a dig maneuver to achieve a tilt angle θ that sufficiently expand the available passing width.

If computer 104 determines that a second portion of roadway within the predetermined distance does not include one or more attributes to provide an available passing width greater than the first sum ("NO" at block 820), process 800 proceeds to a block 825, wherein computer 104 selects the nearest crossroad or driveway 204 as the second location 205 to perform the pass maneuver and proceeds to block 645 of FIG. 6. The computer 104 may be programmed to select a nearest crossroad or driveway 204 as the second location 205 to perform the pass maneuver only when road 202 otherwise remains too narrow and lacks other attributes (e.g., a slope or soft surface condition permitting a tilt angle θ) that may permit expanding the available passing width.

If computer 104 determines that a second portion of roadway within the predetermined distance has a one or more attributes to provide an available passing width greater than the first sum ("YES" at block 820), process 800 proceeds to a next block 830, wherein computer 104 determines whether a dig maneuver using a soft surface condition to achieve a tilt angle θ is warranted. If computer 104 determines that a dig maneuver is not warranted ("NO" at block 830), process 800 moves to block 835, wherein computer 104 selects the second portion of road 202 as the second location 205 and proceeds to block 645 of FIG. 6.

If computer 104 determines that a dig maneuver is warranted ("YES" at block 830), process 800 moves to block 840, wherein computer 104 selects the second portion of road 202 as the second location 205.

In a next block 845, computer 104 includes dig maneuver instructions in the routing guidance and proceeds to block 645 of FIG. 6.

Figure 9B:
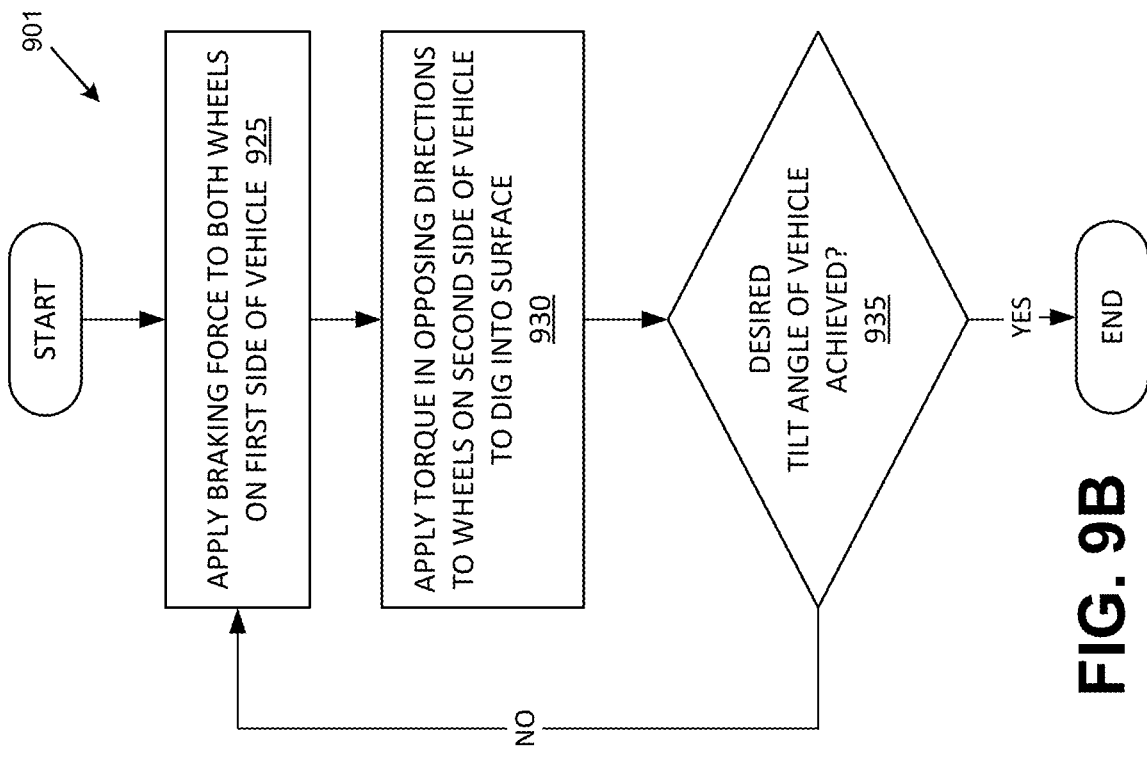
FIGS. 9A and 9B are example flow diagrams of a vehicle process for a dig maneuver to change a vehicle tilt angle for a pass maneuver.
Figure 9A:
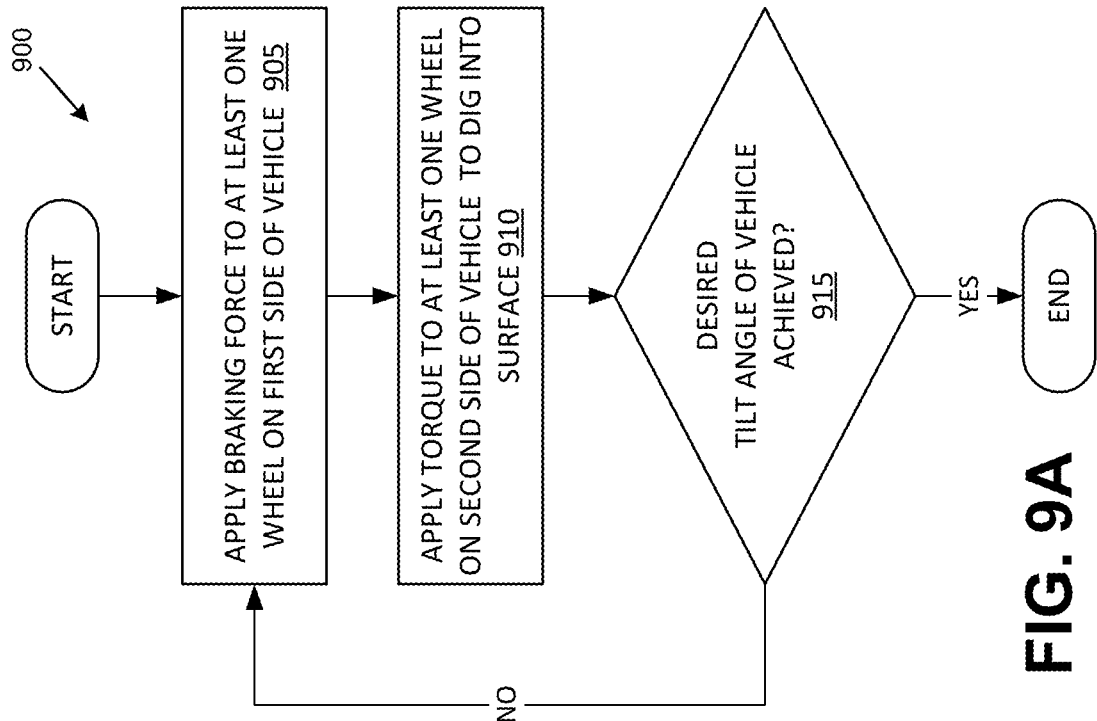

FIGS. 9A and 9B are flow diagrams of example vehicle processes 900 and 901 for a dig procedure to change a vehicle tilt angle for a pass maneuver.

Process 900 may start upon receiving routing guidance with guidance for a dig maneuver.

In a first block 905, computer 104 actuates a braking subsystem to apply a braking force to at least one wheel on a first side of vehicle 102. The first side of the vehicle will typically be an inside wheel relative to the road 202.

In a next block 910, computer 104 actuates a propulsion subsystem to apply a torque to at least one wheel on a second side of vehicle 102. The second side of the vehicle will typically be an outside wheel relative to the road 202.

In a decision block 915, computer 104 receives data from sensors 108 and determines whether a desired tilt angle of vehicle 102 has been achieved. If computer 104 determines that the desired tilt angle of vehicle 102 has not been achieved ("NO" at block 915), process 900 returns to block 905. If computer 104 determines that the desired tilt angle of vehicle 102 has been achieved ("YES" at block 915), process 900 ends.

Process 901 may start upon receiving routing guidance with guidance for a dig maneuver.

In a first block 925, computer 104 actuates a braking subsystem to apply a braking force to both wheels on a first side of vehicle 102. The first side of the vehicle will typically be an inside wheel relative to the road 202.

In a next block 930, computer 104 actuates a propulsion subsystem to apply a torque in opposing directions to the wheels on a second side of vehicle 102. The second side of the vehicle will typically be an outside wheel relative to the road 202.

In a decision block 935, computer 104 receives data from sensors 108 and determines whether a desired tilt angle of vehicle 102 has been achieved. If computer 104 determines that the desired tilt angle of vehicle 102 has not been achieved ("NO" at block 935), process 901 returns to block 925. If computer 104 determines that the desired tilt angle of vehicle 102 has been achieved ("YES" at block 935), process 901 ends.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

In the drawings, the same or like reference numbers indicate the same or like elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising: a computer including a processor and a memory, the memory storing instructions executable by the processor including instructions to:

determine a first passing width of a first vehicle based on (1) a first vehicle angle to a horizontal plane defined with respect to a road and (2) a first vehicle lateral width;

upon determining that a sum of the first passing width and a second passing width of a second vehicle exceeds a first available passing width at a first location, determine a second location having a second available passing width greater than or equal to the first and second passing widths; and transmit to the first vehicle and/or the second vehicle the second location and/or routing guidance based on the second location;

wherein the routing guidance includes guidance for a dig maneuver where one of the first vehicle or the second vehicle actuate a braking force on inner wheels and actuate opposing torque forces on respective outer wheels to dig the outer wheels into the surface conditions to achieve the first vehicle angle or a second vehicle angle, wherein the inner wheels are on a side of the respective vehicle furthest from an edge or boundary of the road and the outer wheels are on a side of the respective vehicle closest to the edge or boundary of the road.

2. The system of claim 1, wherein the second passing width of the second vehicle is determined based upon first vehicle sensor data, vehicle-to-vehicle (V2V) communication, and/or Bluetooth Low Energy (BLE) communication.

3. The system of claim 1, wherein the first vehicle angle to the horizontal plane is determined from topography data, wherein the topography data includes road width, road slope, and a condition of a road surface.

4. The system of claim 3, wherein the topography data further includes one or more of a guardrail position, a drop-off portion of the road surface, a bridge, a crossroad, a pull-off where the road surface widens, or a driveway.

5. The system of claim 3, wherein the instructions to determine the second location further include instructions to determine the first and second passing widths at the second location based on the first vehicle angle at the second location and a second vehicle angle to the horizontal plane defined with respect to the roadway at the second location as determined based on the topography data.

6. The system of claim 1, wherein the routing guidance is transmitted to the first vehicle and includes guidance to the first vehicle for a dig maneuver at the second location, the guidance for the dig maneuver including to actuate a braking force on at least one inner wheel of the first vehicle and to actuate a torque force to at least one outer wheel of the first vehicle to dig the at least one outer wheel into a surface of the road to achieve the first vehicle angle.

7. The system of claim 6, wherein the routing guidance includes guidance to the second vehicle to proceed over a portion of a tire of the first vehicle.

8. A method performed by a first vehicle, comprising:
  determining a first passing width of a first vehicle based on (1) a first vehicle angle to a horizontal plane defined with respect to a road and (2) a first vehicle lateral width; and
  upon determining that a sum of the first passing width and a second passing width of a second vehicle exceeds a first available passing width at a first location, determining a second location having a second available passing width greater than or equal to the first and second passing widths; and
  transmitting to the first vehicle and/or the second vehicle the second location and/or routing guidance based on the second location;
  wherein the routing guidance includes guidance for a dig maneuver where one of the first vehicle or the second vehicle actuate a braking force on inner wheels and actuate opposing torque forces on respective outer wheels to dig the outer wheels into the surface conditions to achieve the first vehicle angle or a second vehicle angle, wherein the inner wheels are on a side of the respective vehicle furthest from an edge or boundary of the road and the outer wheels are on a side of the respective vehicle closest to the edge or boundary of the road.

9. The method of claim 8, wherein the second passing width of the second vehicle is determined based on first vehicle sensor data, vehicle-to-vehicle (V2V) communication, and/or Bluetooth Low Energy (BLE) communication.

10. The method of claim 8, wherein the first vehicle angle to the horizontal plane is determined from topography data, wherein the topography data includes road width, road slope, and a condition of a road surface.

11. The method of claim 10, wherein the topography data further includes one or more of a guardrail position, a drop-off portion of the road surface, a bridge, a crossroad, a pull-off where the road surface widens, or a driveway.

12. The method of claim 10, wherein determining the second location further includes determining the first and second passing widths at the second location based on the first vehicle angle at the second location and a second vehicle angle to the horizontal plane defined with respect to the roadway at the second location as determined based on the topography data.

13. The method of claim 8, wherein the routing guidance is transmitted to the first vehicle and includes guidance to the first vehicle for a dig maneuver at the second location, the guidance for the dig maneuver including actuating a braking force on at least one inner wheel and actuating a torque force to at least one outer wheel to dig the at least one outer wheel into a surface of the road to achieve the first vehicle angle.

14. The method of claim 13, wherein the routing guidance includes guidance to the second vehicle to proceed over a portion of a tire of the first vehicle.

15. A system, comprising: a computer including a processor and a memory, the memory storing instructions executable by the processor including instructions to:
  determine a first passing width of a first vehicle based on (1) a first vehicle angle to a horizontal plane defined with respect to a road and (2) a first vehicle lateral width;
  upon determining that a sum of the first passing width and a second passing width of a second vehicle exceeds a first available passing width at a first location, determine a second location having a second available passing width greater than or equal to the first and second passing widths;
  actuate a propulsion subsystem, a steering subsystem, and/or a braking subsystem of the first vehicle to proceed to the second location; and
  upon reaching the second location, actuate the braking subsystem to apply a braking force on first vehicle inner wheels and actuate the propulsion subsystem to apply opposing torque forces on respective first vehicle outer wheels to dig outer wheels into a surface of the road to achieve the first vehicle angle at the second location, wherein the first vehicle inner wheels are on a side of the first vehicle furthest from an edge or boundary of the road and the first vehicle inner wheels are on a side of the first vehicle closest to the edge or boundary of the road.

16. The system of claim 15, wherein the first vehicle angle to the horizontal plane is determined from topography data, wherein the topography data includes road width, road slope, a condition of a road surface, a guardrail position, a drop-off portion of the road surface, a bridge, a crossroad, a pull-off where the road surface widens, or a driveway.

17. The system of claim 16, wherein the instructions to determine the second location further include instructions to determine the first and second passing widths at the second location based on the first vehicle angle at the second location and a second vehicle angle to the horizontal plane defined with respect to the roadway at the second location as determined based on the topography data.

18. A method performed by a first vehicle, comprising:

determining a first passing width of a first vehicle based on (1) a first vehicle angle to a horizontal plane defined with respect to a road and (2) a first vehicle lateral width;

upon determining that a sum of the first passing width and a second passing width of a second vehicle exceeds a first available passing width at a first location, determining a second location having a second available passing width greater than or equal to the first and second passing widths;

actuating a propulsion subsystem, a steering subsystem, and/or a braking subsystem of the first vehicle to proceed to the second location; and upon reaching the second location, actuating the braking subsystem to apply a braking force on first vehicle inner wheels and actuate the propulsion subsystem to apply opposing torque forces on respective first vehicle outer wheels to dig outer wheels into a surface of the road to achieve the first vehicle angle at the second location, wherein the first vehicle inner wheels are on a side of the first vehicle furthest from an edge or boundary of the road and the first vehicle inner wheels are on a side of the first vehicle closest to the edge or boundary of the road.

19. The method of claim 18, wherein the first vehicle angle to the horizontal plane is determined from topography data, wherein the topography data includes road width, road slope, a condition of a road surface, a guardrail position, a drop-off portion of the road surface, a bridge, a crossroad, a pull-off where the road surface widens, or a driveway.

20. The method of claim 19, wherein determining the second location further includes determining the first and second passing widths at the second location based on the first vehicle angle at the second location and a second vehicle angle to the horizontal plane defined with respect to the roadway at the second location as determined based on the topography data.

\* \* \* \* \*